United States Patent
Mathews

(10) Patent No.: US 11,485,431 B2
(45) Date of Patent: Nov. 1, 2022

(54) SPARE TIRE SUPPORT

(71) Applicant: ONE-T, LLC, Sycamore, IL (US)

(72) Inventor: Brian Mathews, Sycamore, IL (US)

(73) Assignee: ONE-T LLC, Sycamore, IL (US)

( * ) Notice: Subject to any disclaimer, the term of this patent is extended or adjusted under 35 U.S.C. 154(b) by 0 days.

(21) Appl. No.: 17/201,192

(22) Filed: Mar. 15, 2021

(65) Prior Publication Data
US 2021/0284256 A1    Sep. 16, 2021

Related U.S. Application Data

(60) Provisional application No. 62/989,924, filed on Mar. 16, 2020.

(51) Int. Cl.
*B62D 43/02* (2006.01)
*B60R 9/06* (2006.01)

(52) U.S. Cl.
CPC .............. *B62D 43/02* (2013.01); *B60R 9/06* (2013.01)

(58) Field of Classification Search
CPC .......... B60R 9/06; B62D 43/02; B62D 43/002
See application file for complete search history.

(56) References Cited

U.S. PATENT DOCUMENTS

| | | | | |
|---|---|---|---|---|
| 3,349,977 A * | 10/1967 | Caminiti | ............... | B62D 43/02 224/314 |
| 3,753,520 A * | 8/1973 | Bodde | ................... | B62D 43/02 224/503 |
| 3,845,891 A * | 11/1974 | Becher | ................. | B62D 43/002 224/42.21 |
| 4,212,417 A * | 7/1980 | Scott | ..................... | B62D 43/08 224/403 |
| 4,278,191 A * | 7/1981 | Mecham | ............. | B62D 43/002 224/42.21 |
| 4,410,117 A * | 10/1983 | Crawford | .............. | B62D 43/02 224/403 |
| 4,418,852 A * | 12/1983 | Grinwald | .............. | B62D 43/04 224/310 |
| 4,561,575 A * | 12/1985 | Jones | ..................... | B62D 43/02 224/42.21 |
| 4,630,990 A * | 12/1986 | Whiting | ................. | B60R 9/042 224/310 |
| 4,679,717 A * | 7/1987 | Hansen | ................. | B62D 43/02 224/42.12 |
| 4,799,849 A * | 1/1989 | Miller | ...................... | B60R 5/04 296/37.1 |
| 4,817,834 A * | 4/1989 | Weiler | ................... | B62D 43/02 224/42.21 |
| 4,976,384 A * | 12/1990 | Daniels | ................ | B62D 43/002 224/402 |
| 4,993,610 A * | 2/1991 | Abretske | ................ | B60R 11/00 224/42.13 |
| 5,020,707 A * | 6/1991 | Nozel | .................... | B62D 43/02 224/42.21 |
| 5,186,371 A * | 2/1993 | Jozefczak | ........... | B62D 43/002 224/42.21 |
| 5,538,168 A * | 7/1996 | Burger | .................. | B62D 43/02 224/42.21 |

(Continued)

*Primary Examiner* — Brian D Nash

(57) ABSTRACT

A spare tire support device for providing extra support to an existing spare tire mounted to a vehicle tailgate. The support device is mounted to the vehicle body/frame or existing tow hitch receiver and is positioned under the spare tire to aid in supporting the load thereof.

9 Claims, 4 Drawing Sheets

(56) References Cited

U.S. PATENT DOCUMENTS

| | | | | |
|---|---|---|---|---|
| 5,791,533 A * | 8/1998 | Neag | B62D 43/02 | 224/282 |
| 5,806,736 A * | 9/1998 | Kincart | B62D 43/02 | 224/42.13 |
| 6,237,824 B1 * | 5/2001 | Bagley | B60R 9/06 | 224/532 |
| 6,513,690 B1 * | 2/2003 | Churchill | B60R 9/06 | 224/523 |
| 6,626,340 B1 * | 9/2003 | Burgess | B60R 9/10 | 224/570 |
| 6,659,318 B2 * | 12/2003 | Newbill | B60R 9/06 | 224/282 |
| 7,249,927 B2 * | 7/2007 | Wooten | B62D 43/002 | 224/42.12 |
| 7,597,222 B2 * | 10/2009 | Bishop | B60R 9/06 | 224/42.21 |
| 9,387,739 B2 * | 7/2016 | Babuska | B60D 1/52 | |
| 10,974,777 B1 * | 4/2021 | Ackerman | B60R 9/06 | |
| 11,034,282 B2 * | 6/2021 | Barlow | B60D 1/52 | |
| 2002/0084298 A1 * | 7/2002 | Essig | B62D 43/02 | 224/509 |
| 2003/0086778 A1 * | 5/2003 | Smith | B60P 3/07 | 414/500 |
| 2004/0079774 A1 * | 4/2004 | Roehmer | B60R 11/06 | 224/42.21 |
| 2004/0222261 A1 * | 11/2004 | Wilson | B62D 43/002 | 224/509 |
| 2005/0077327 A1 * | 4/2005 | Kenney | B62D 43/02 | 224/42.21 |
| 2005/0129490 A1 * | 6/2005 | Hutchins | B60P 3/122 | 414/462 |
| 2006/0244186 A1 * | 11/2006 | Wells | B60P 1/5476 | 267/131 |
| 2009/0047108 A1 * | 2/2009 | Barie | B62D 43/002 | 414/427 |
| 2014/0091554 A1 * | 4/2014 | Columbia | B60D 1/07 | 280/504 |
| 2017/0267181 A1 * | 9/2017 | Hoffman | B60R 3/007 | |
| 2019/0126840 A1 * | 5/2019 | Grossaint | B60R 19/48 | |
| 2019/0126997 A1 * | 5/2019 | Wymore | B62D 43/02 | |

* cited by examiner

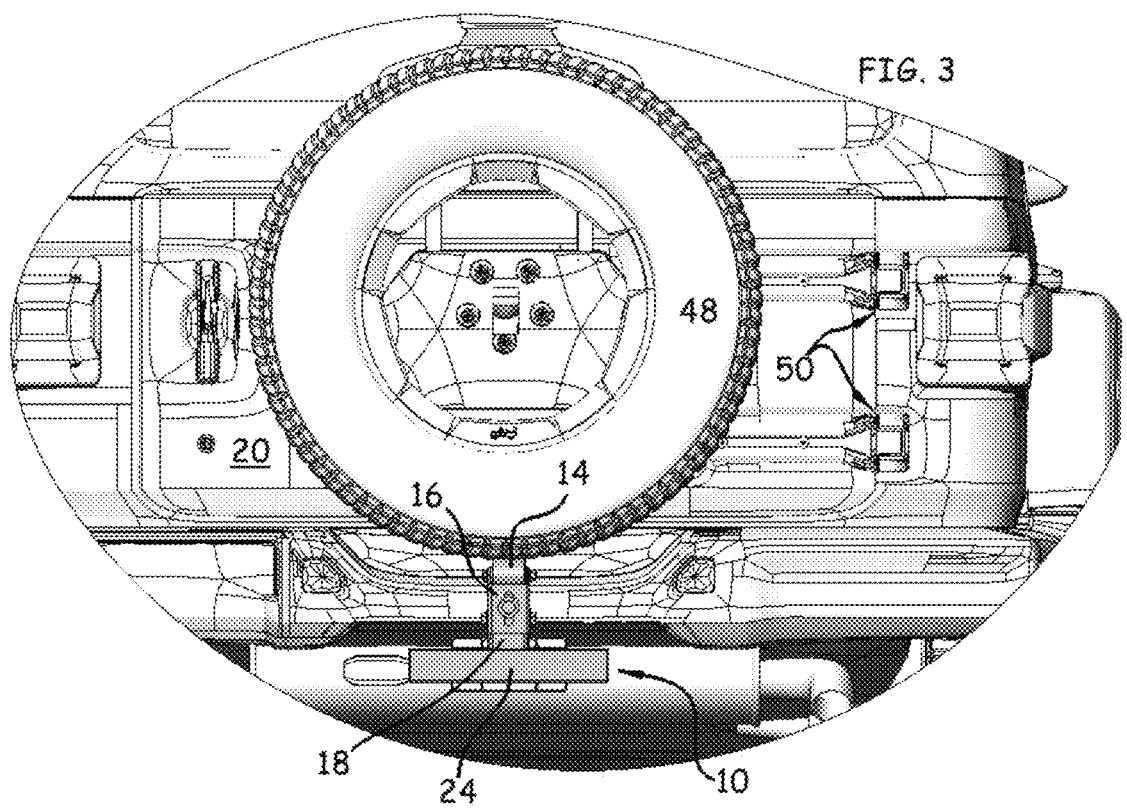
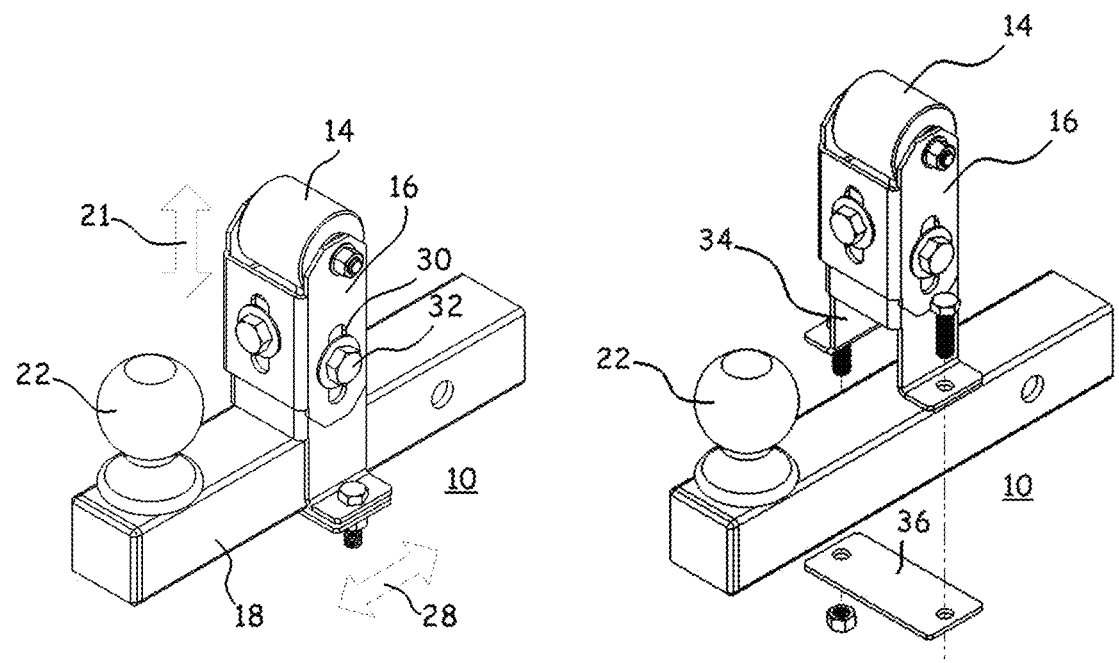
FIG. 4
FIG. 5

SPARE TIRE SUPPORT

CROSS-REFERENCE TO RELATED APPLICATION

This application claims the benefit of U.S. Provisional Patent Application No. 62/989,924 filed Mar. 16, 2020, which is hereby incorporated by reference in its entirety herein.

BACKGROUND OF THE INVENTION

I. Field of the Invention

The present disclosure relates generally to spare tire support devices, and more specifically to a device to provide extra support to an existing spare tire mount.

II. Description of the Prior Art

Certain vehicles, including but not limited to SUVs, having a rear tailgate mounted spare tire are highly susceptible to damage caused by increased weight of large tires and wheels. This is especially true with the Jeep® Wrangler brand as well as the Ford® Bronco brand, among others. Indeed, it has been found that these vehicles sustain structural and aesthetic damage from prolonged carrying of extra weight supported only by the factory tailgate hinges and latch.

Current options available to attempt to alleviate such damage include new rear bumpers with integrated tire mounts and/or stiffening brackets that mount to the rear door. Such options have proved costly, inadequate and/or unworkable.

The present disclosure overcomes the problems associated with the aforementioned conventional rear tailgate mounted spare tire vehicles as well as currently available options to alleviate the problems. Accordingly, it is a general object of this disclosure to provide a support device for use with such vehicles.

It is another general object of the present disclosure to provide an aftermarket support device for rear tailgate mounted spare tire vehicles.

It is a more specific object of the present disclosure to provide a spare tire support assembly coupled to a rear tailgate mounted spare tire vehicle body/frame.

It is another specific object of the present disclosure to provide a spare tire support apparatus coupled to the hitch receiver of a rear tailgate mounted spare tire vehicle.

Yet another object of the present disclosure is to provide an adjustable support device for rear tailgate mounted spare tire vehicles of different sizes.

Still another object of the present disclosure is to provide a smaller, less costly and simpler to install rear tailgate mounted tire support option than currently available in the marketplace.

These and other objects, features and advantages of this disclosure will be clearly understood through a consideration of the following detailed description.

SUMMARY OF THE INVENTION

According to an embodiment of the present disclosure, there is provided a device for supporting a vehicle tailgate mounted spare tire including a support member mounted to the vehicle body or hitch receiver, a tire contact roller and a positioning assembly for positioning the tire contact under the spare tire to help support the load thereof.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which:

FIG. 3 is an enlarged rear view of the spare tire support device of Figure

FIG. 4 is a perspective view of an alternate embodiment of the tire support assembly according to the principles of the present disclosure.

FIG. 5 is an assembly view of the tire support device of FIG. 4.

DESCRIPTION OF THE PREFERRED EMBODIMENTS

One or more embodiments of the subject disclosure will now be described with the aid of numerous drawings. Unless otherwise indicated, use of specific terms will be understood to include multiple versions and forms thereof.

Figure 1:
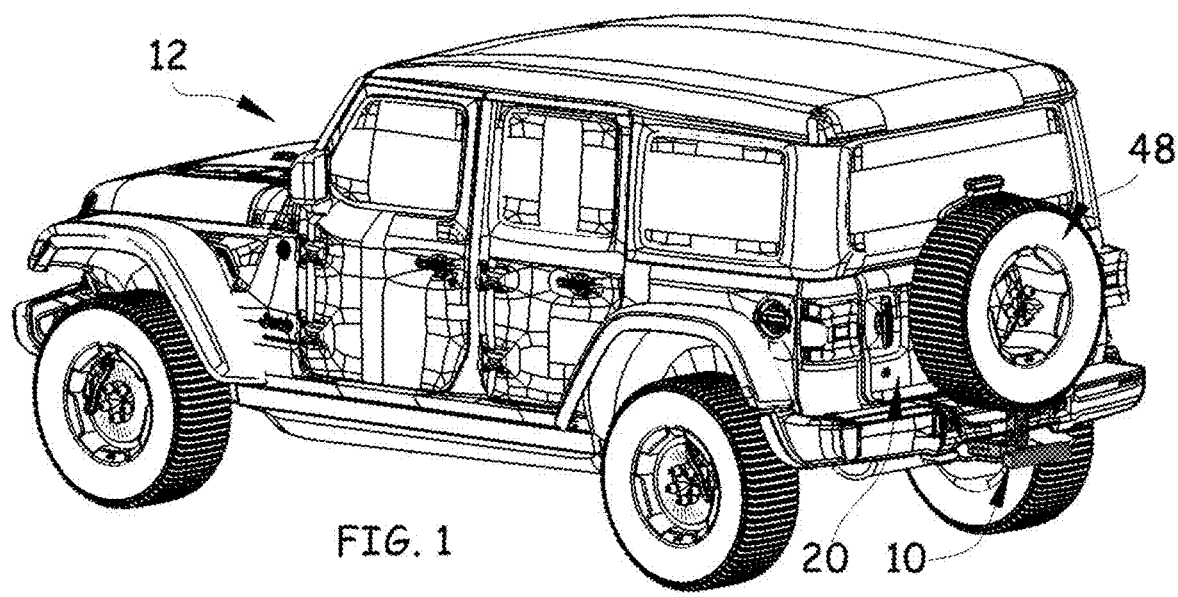
FIG. 1 is a rear perspective view of an exemplar vehicle including the spare tire support device according to the principles of an embodiment of the present disclosure.
Figure 2:
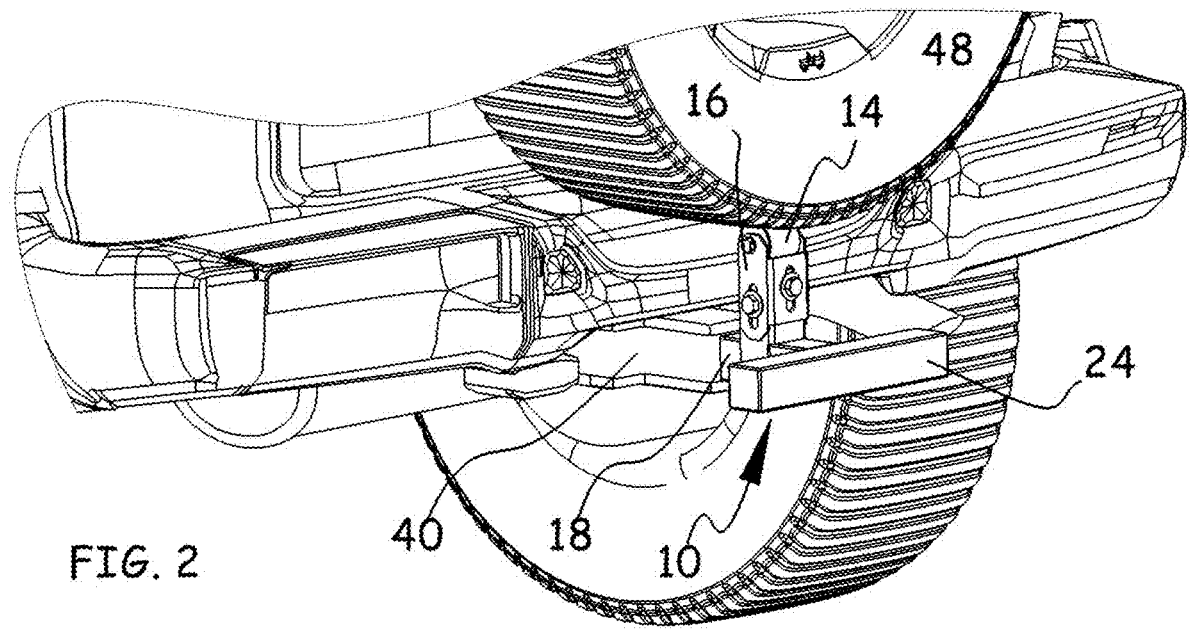
FIG. 2 is an enlarged view of the spare tire support device of FIG. 1.

Turning now to the figures, and in particular FIGS. 1-3, an embodiment of the spare tire support device 10 is illustrated mounted to an exemplar vehicle 12 in the perspective view. The main component parts of the device 10 includes the tire contact 14, a tire contact positioner assembly 16 and a support member 18. It will be appreciated that while the following description provides for component parts of the device 10, it may consist of fewer parts are even one part. In any event, the tire contact is preferably, but not limited to, a biased or unbiased roller assembly that engages the tire when opening and closing the tailgate 20 of the vehicle 12.

FIGS. 4 and 5 illustrate an embodiment of the tire support device 10 that includes a trailer hitch ball 22 instead of the horizontal (foot) support 24 of the device of FIGS. 1-3. FIG. 4 further shows how the height 26 and horizontal positioning 28 of the device may be adjusted. For example, the contact positioner assembly 16 may include one or more vertical slots 30 and cooperating locking fasteners 32 to adjust the height 26. Similarly, the contact positioner assembly 16 may also include a support member engagement portion 34 and cooperating plate 36 with nut/bolt locking fasteners 38 to adjust the horizontal positioning 28. It will be appreciated that the adjustability of the tire support device will not be limited to that as shown. Indeed, the height and depth of the positioning of the tire contact 14 may be accomplished in a plethora of different structural designs. Furthermore, the tire contact may be further biased against the tire after size fitting adjustments. Such biasing may include, but not be limited to, a compression spring, piston, pressure arm or other means.

Figure 6:
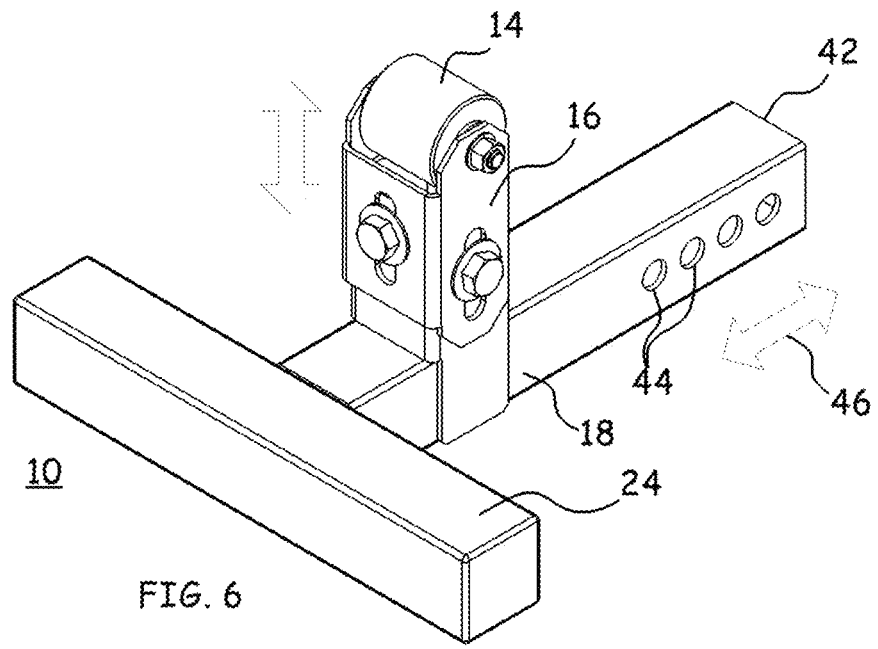
FIG. 6 is a perspective view of another alternate embodiment of the tire support assembly according to the principles of the present disclosure.
Figure 7:
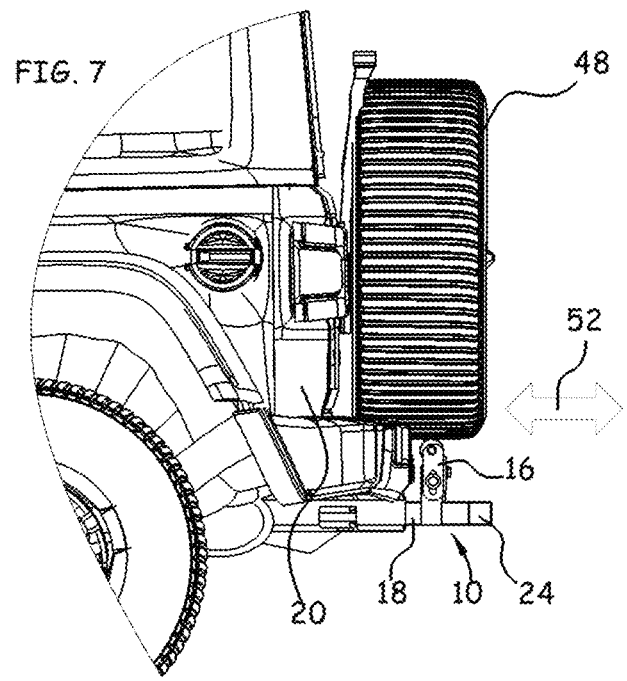
FIG. 7 is a side view of the spare tire support device shown in FIG. 1

The spare tire support 10 may be mounted to the vehicle 12 body/frame via a tow hitch receiver 40 (FIG. 2). In particular, the device 10 may include a hitch end 42, see FIG. 6. This hitch end 42 may further include positioning holes 44 to adjust the horizontal position 46 of the tire support device 10. However the tire contact 14 may be adjusted and positioned for different tire diameters as well as tire wear, it will be appreciated that the crux is to position same under the spare tire/wheel assembly 48 to help support the load thereof and remove the stress such an assembly 48 exerts on the vehicle 12 tailgate hinges 50 (FIG. 3), etc., while still allowing for the tailgate to open/close 52 via roller tire contact 14.

Figure 8:
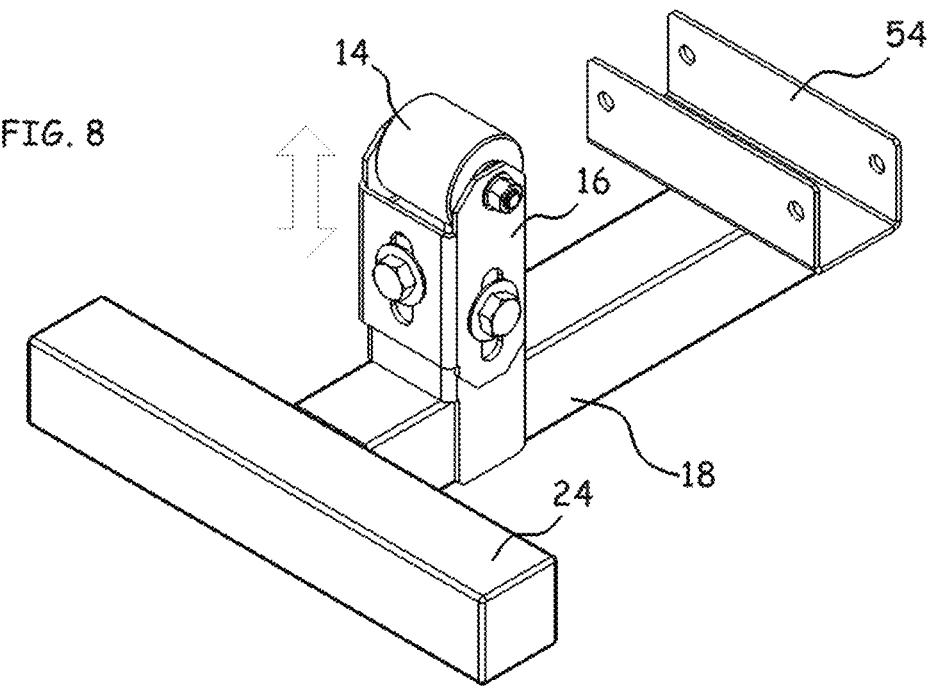
FIG. 8 is a perspective view of an alternate embodiment of the tire support assembly according to the principles of the present disclosure.

The spare tire support 10 may be mounted to the structure/body/frame of the vehicle 12 instead of via a tow hitch receiver. This embodiment is illustrated in FIG. 8. In particular, and by means of example, the device 10 may be mounted via a vehicle mount assembly 54, which may include nut/bolt fasteners or the like.

Figure 9:
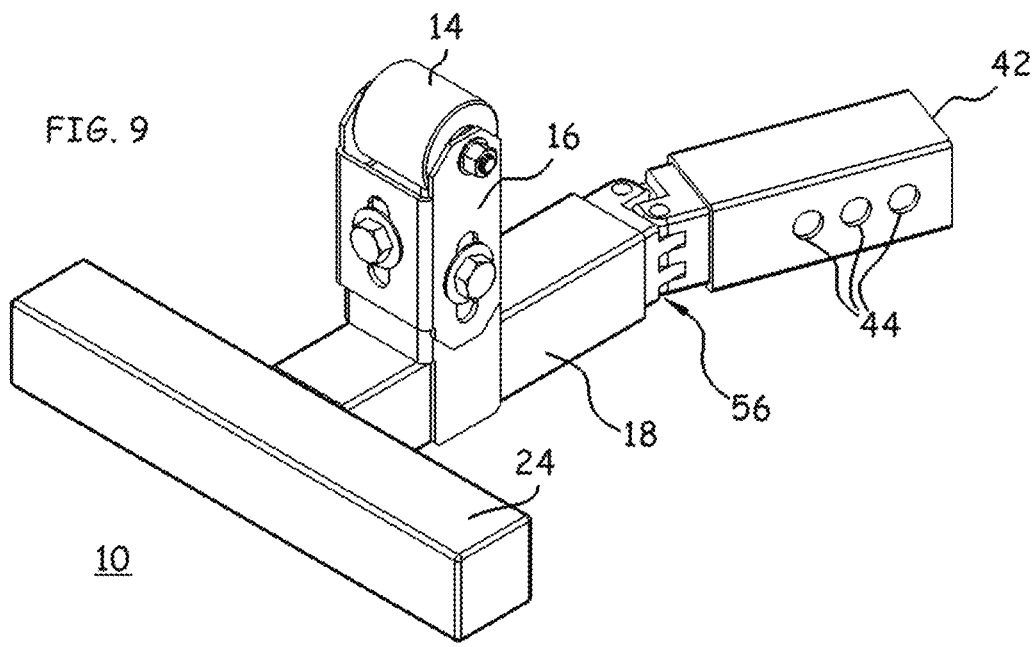
FIG. 9 is a perspective view of another alternate embodiment of the tire support device according to the principles of the present disclosure.

FIG. 9 illustrates a spare tire support 10 with an additional hinged assembly 56 between the main support member 18 and the hitch end 42. This would provide a further adjustable aspect to the device 10, in the horizontal plane, for example.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention in its broader aspects, and, therefore, the aim in the appended claims is to cover all such changes and modifications as fall within the true spirit and scope of the present disclosure.

What is claimed is:

1. A device for supporting a vehicle tailgate mounted spare tire, the device comprising:
    a support member mounted to the vehicle;
    a biased tire contact coupled to said support member;
    a positioner assembly for positioning said tire contact under an existing tailgate mounted spare tire whereby the device provides additional support for said tire.

2. The device as defined in claim 1 wherein said support member includes a vehicle mount assembly for mounting the device on a vehicle frame.

3. The device as defined in claim 1 wherein said support member includes a tow hitch engagement end for mounting the device to a vehicle tow hitch receiver.

4. The device as defined in claim 1 wherein said tire contact is a roller assembly.

5. The device as defined in claim 1 wherein said positioning assembly adjusts a height of said tire contact.

6. The device as defined in claim 1 wherein said positioning assembly adjusts a depth of said tire contact.

7. The device as defined in claim 1 wherein said support member includes a trailer hitch ball.

8. The device as defined in claim 1 wherein said supporting member includes a horizontal foot member.

9. The device as defined in claim 1 wherein said supporting member includes a hinged portion.

* * * * *